June 22, 1965 E. M. MATTIS 3,190,969

METHOD FOR STEREOPHONIC RE-RECORDING

Filed March 28, 1960

Edward M. Mattis
INVENTOR.

BY

Watson, Cole, Grindle & Watson
ATTORNEYS.

3,190,969
METHOD FOR STEREOPHONIC RE-RECORDING
Edward M. Mattis, 1037 SE. 12th Way, Fort Lauderdale, Fla.
Filed Mar. 28, 1960, Ser. No. 18,151
6 Claims. (Cl. 179—100.1)

Figure 1:
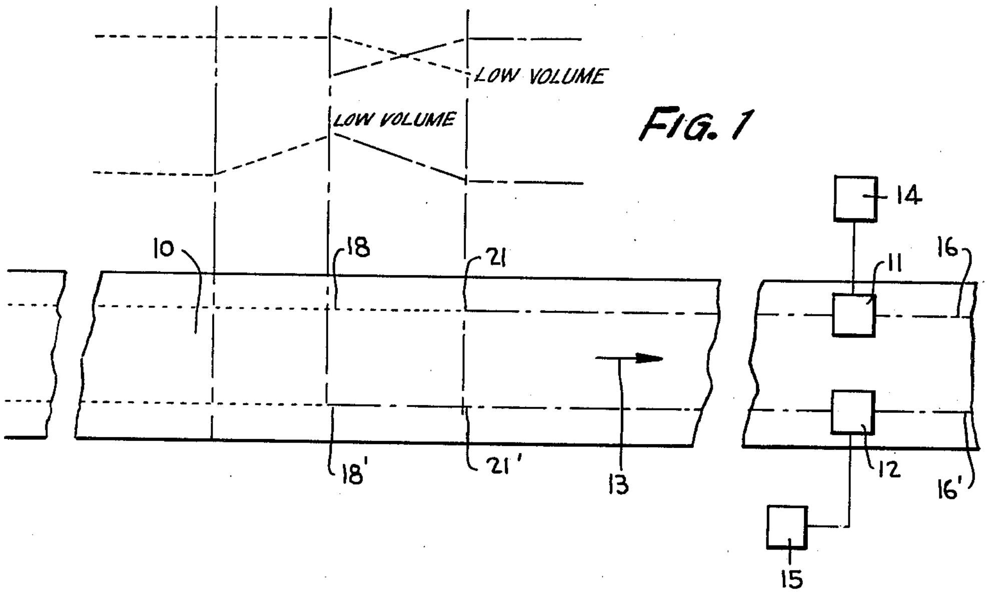

This invention relates to a method of re-recording and more particularly to a method of stereophonic re-recording.

Priorly, numerous methods have been employed to record and re-record stereophonic sound. In these systems, particularly in the instance of recording music, gaps occur in the recording preceding and following each of the selections. The transition from one selection to another is rather monotonous and not necessarily pleasing to the ear.

Accordingly, it is an object of this invention to provide an improved method of re-recording which will obviate the above-mentioned disadvantages.

It is another object of this invention to provide an improved method for re-recording particularly suitable for music which will make the music more interesting and less monotonous.

It is another object of this invention to provide a method of re-recording which obviates the blank spaces between selections while making a transition from one selection to the other which is very pleasing to the ear.

Stereophonic recording is produced by the recording of separate bands of frequencies on separate tracks. These tracks may be at right angles to each other in the case of the disc-type record. The depth of the undulations of each track is determined by the amplitude of the signal fed from the respective amplifier. Movement of the playback needle is sensed in perpendicular planes by separate devices, each connected to a separate amplifier channel and speaker. In the case of tape recording, the separate channels are recorded in spaced parallel tracks on the tape by separate magnetic recording heads, each connected through an individual amplifier to an individual transducer.

In accordance with known methods of recording and re-recording, the recording of both tracks is initiated simultaneously and terminated simultaneously. Further, the recording of both tracks is carried out with substantially the same amplification of signals through the respective channel amplifiers. Between each selection on the recording medium a blank or unrecorded space is provided to permit an interval of silence between each selection.

Briefly, in accordance with aspects of this invention, the re-recording of the first selection is started on both tracks at the same point at full volume. Near the end of the first selection, the volume of both tracks is simultaneously and gradually reduced until the end of the selection. The tape or disc record is then returned to a point prior to the end of the first selection and the re-recording of the second selection is started on only one of the tracks at low volume and gradually increased. The full volume of the second selection on the one track is attained at the end of the recording of the first selection on the second track. At this point, the second selection is also introduced on the second track at low volume and the volume of the signal applied to the second track transducer gradually increased until both tracks are recorded at full volume. These steps are again repeated at the end of the second selection to make a transition between the second and third and each of the subsequent selections.

In accordance with another illustrative method of this invention, both of the tracks are recorded with the first selection at full volume. Near the end of the first selection the volume control of one of the amplifiers for one of the tracks is gradually reduced. When the volume control on the one track is reduced to a normally inaudible range, signals from the second selection are fed through the first track amplifier and the volume control gradually advanced. When the volume of the second selection on the first track is advanced to its normal level, the volume control on the second track is reduced. As the volume control for the second track is reduced, the volume control for the first track is increased. When the volume control for the second track is reduced to a normally inaudible range re-recording of the second selection is begun on the second track at low volume and the second track volume control is gradually advanced.

In accordance with these illustrative embodiments transitions between selections are made which are very pleasant to the ear. Further, the transitions are made in such a fashion that none of the recording medium is lost or is occupied by blank spaces. In this method, it is particularly advantageous, although not essential, to have each following selection in the same key and tempo as the preceding selection.

Figure 2:
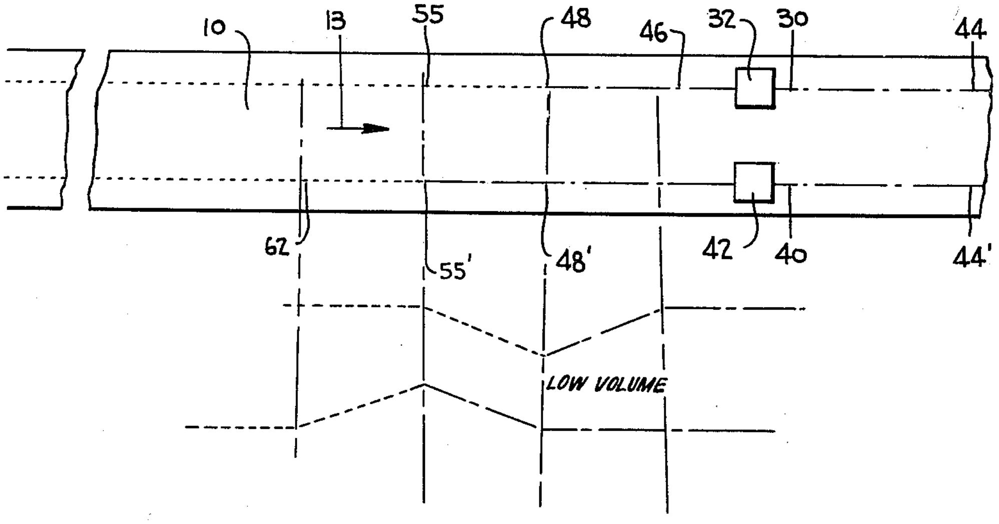

These and various other objects and features of the invention will be more clearly understood from a reading of the detailed description in conjunction with the drawings, in which:

FIGURE 1 is a diagrammatic and block representation of the elements of one illustrative method of re-recording as applied to magnetic tape; and FIGURE 2 is a diagrammatic and block representation of the elements of another illustrative embodiment of this method as applied to magnetic tape.

Referring now to FIGURE 1, there is depicted, in diagrammatic and block form, a magnetic tape 10 which is presumed to be moving past the recording heads 11 and 12 in the direction shown by the arrow 13. It is assumed that separate amplifiers 14 and 15, connected to heads 11 and 12 respectively, are each feeding separate bands of frequencies of the predetermined selections to respective recording heads 11 and 12.

In accordance with the first illustrative method of this invention, recording on both tracks of the first selection at full volume is begun at points 16 and 16′. Decrease in volume is diagrammatically shown for each selection by a departure from the track in the processing areas. Throughout this description, the use of whole and corresponding prime numbers indicates immediately adjacent points on opposite tracks of the tape. The first selection is recorded in its entirety and is terminated simultaneously on both tracks at points 18 and 18′ after gradually reducing volume on both tracks from points 21 and 21′ until the termination points 18 and 18′ are reached. The tape 10 is then moved back a relatively short distance, such as 2 feet for a tape speed of 1¾ inches per second, to points 21 and 21′ where the recording of the second selection is begun at point 21 at low volume by the recording head 11 and its associated amplifier 14. It is understood that two stereophonic transcription sources are available and are each connected in parallel to the inputs of the respective track amplifiers 14 and 15. Such an arrangement may be easily achieved by the use of an Ampex Stereo Tape recorder of the 950 series. The volume control of amplifier 14 is gradually increased from point 21 to point 18 on the first track. At point 18′ the recording of the second selection is begun on the second track with the volume control of amplifier 15 set for low volume. The volume control of amplifier 15 is gradually increased to the same volume as that of amplifier 14. These steps are repeated for each transition from one selection to another. Accordingly, when the music is reproduced transitions are made between selections in a manner which is pleasing to the listener.

Referring now to FIGURE 2, there is depicted in diagrammatic and block form the elements of another illustrative method of this invention. As herein depicted, the tape 10 has a first track 30 and a second track 40. Magnetic recording head 32 records on the first track, 30, while head 42 records on the second track, 40. At points 44 and 44′, the recording of the first selection is begun on each of tracks 30 and 40 at full, i.e. normal, volume. From point 46 the volume of the signal applied to the first track 30 is gradually reduced until it is beneath the normally audible range at point 48. At this point, the second selection is begun at low volume on track 30. With the beginning of the second selection, such as at point 48′, the volume control of the second track amplifier is gradually reduced to a point below the audible range. From point 48 to point 55, the volume of the signal applied to track 30 is gradually increased until full volume is achieved on track 30. The recording of the first selection on track 40 is terminated at point 55′. At point 55′ the recording of the second selection on the second track is begun with the input signal at low volume and this volume is gradually increased until point 62 is reached at which both of the channels are beging recorded with the second selection at full volume. As previously pointed out, this method of re-recording is particularly pleasing to the ear if subsequent selections are recorded in the same key and tempo as the preceding selections. This, however, is not essential.

In each of the above illustrative examples of this novel method, the transition from one selection to the next is made without any abrupt interruptions or blank spots. The second illustrative method is also applicable to disc-type records but in each of these illustrative embodiments, great facility can be achieved by the use of a stereophonic magnetic recorder.

These novel concepts may be applied to various other methods without departing from the spirit and scope of this invention as defined in the claims.

What is claimed is:

1. A method of stereophonic re-recording comprising the steps of re-recording the greater part of a first musical selection on two tracks of the recording medium, starting the recording of a second musical selection on one of the tracks and before the first selection is finished on the other of said tracks, starting the recording of the second selection on said other track and further comprising the step of starting the re-recording of said second musical selection on said one track with the recording signal at a low volume and gradually increasing the signal volume until full volume is achieved at the end of the first musical selection on said other track.

2. A method of stereophonic re-recording according to claim 1 wherein the terminal portion of the first selection on said one track is decreased in volume and the re-recording of said second selection begun at the initial point of volume decrease.

3. A method of stereophonic re-recording according to claim 2 wherein the re-recording of said second selection on said one track is begun at reduced signal volume and the volume gradually increased until the end of said first selection on said other track is reached, at which time the signal volume is at normal level.

4. A method of stereophonic re-recording according to claim 3 wherein the re-recording of said second selection on said other track is begun with the recording signal at reduced volume and the volume gradually increased until full volume is achieved.

5. A method of stereophonic re-recording according to claim 4 wherein the volume of the signal applied to said one track is reduced immediately prior to the re-recording of said second selection and the volume of said second selection is begun on said one track at a low volume and gradually increased until full volume is achieved at a point corresponding to the end of said first selection on said other track.

6. A method of stereophonic re-recording according to claim 5 wherein the volume of the signal applied to said other track is reduced immediately prior to the end of said first selection.

References Cited by the Examiner

UNITED STATES PATENTS 2,899,505 8/59 Dresser ............... 179—100.1

OTHER REFERENCES

Elements of Magnetic Tape Recording, Haynes, pp. 174–177, 1957, Prentice-Hall, Englewood Cliffs, N.J.

Magnetic Sound Recording, Snel, pages 161–163, 1959.

Techniques of Magnetic Recording, Tall, pages 231–233, 1958, The Macmillan Co., New York.

IRVING L. SRAGOW, *Primary Examiner.*

NEWTON N. LOVEWELL, BERNARD KONICK, *Examiners.*